United States Patent
Sako et al.

(10) Patent No.: US 6,344,940 B1
(45) Date of Patent: *Feb. 5, 2002

(54) METHOD AND APPARATUS FOR ADDING 1/F FLUCTUATION TO AN AUDIO SIGNAL

(75) Inventors: Yoichiro Sako; Heitaro Nakajima, both of Toyko (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,417

(22) Filed: Nov. 28, 1997

(30) Foreign Application Priority Data

Nov. 29, 1996 (JP) ............................. 8-320459

(51) Int. Cl.$^7$ ................................. G11B 5/09
(52) U.S. Cl. ....................................... 360/32
(58) Field of Search ................ 360/32, 48, 8, 360/25, 51, 46; 369/88, 124.05; 341/144, 155; 381/94.1

(56) References Cited

U.S. PATENT DOCUMENTS 4,833,549 A * 5/1989 Yoshimoto et al. ........... 360/32
4,875,484 A * 10/1989 Anzai et al. ................. 128/421

FOREIGN PATENT DOCUMENTS

| JP | 4-275596 A1 | * 10/1992 | ................. 360/32 |
| JP | 4-280197 A1 | * 10/1992 | ................. 360/32 |
| JP | 7-28177 A1 | * 1/1995 | ................. 360/32 |
| JP | 7-262403 A1 | * 10/1995 | ................. 360/32 |
| JP | 8-6562 A1 | * 1/1996 | ................. 360/32 |
| JP | 8-160980 | * 6/1996 | |

* cited by examiner

Primary Examiner—Alan T. Faber
(74) Attorney, Agent, or Firm—Frommer Lawrence & Haug LLP; William S. Frommer; Darren M. Simon

(57) ABSTRACT

The present invention provides a digital signal reproduction apparatus and a digital signal reproduction method which employs fluctuation in a sampling or quantization process, so as to eliminate lack of depth feeling in digital data, increasing the pleasantness. In a case when a switch 19 is OFF and a switching circuit 20 is set to at terminal b, a clock generator 17 generates a master clock MCK having a 1/f fluctuation according to a signal generated by a fluctuation function generating circuit 18. This master clock MCK is supplied to a D/A converter 13, an aperture circuit 14, and a low pass filter 15. The D/A converter 13 converts a digital signal into an analog signal having an amplitude A with an amplitude fluctuation ΔA (A±ΔA). Thus, the D/A converter 13 is capable of adding a 1/f fluctuation in the amplitude direction (power axis direction) of the analog signal.

22 Claims, 3 Drawing Sheets

METHOD AND APPARATUS FOR ADDING 1/F FLUCTUATION TO AN AUDIO SIGNAL

BACKGROUND OF THE INVENTION

1. Field of the Invention

The present invention relates to a digital signal reproduction apparatus and a digital signal reproduction method which can preferably be used for an audio apparatus, a video apparatus, and the like, and particularly relates to a signal reproduction apparatus, a digital signal reproduction method, a digital signal recording apparatus, a digital signal recording method, and a recording medium which are capable of providing a pleasant, comfortable sound and image.

2. Description of the Prior Art

The natural phenomena surrounding us such as wind, light, and temperature have temporal and spatial fluctuations. These fluctuations are considered to be a factor of pleasantness which cannot be obtained from artificial devices. Recently, special attention is paid on 1/f fluctuation as a desirable fluctuation for humans as biological beings.

As for an electronic apparatus employing the 1/f fluctuation, Japanese Patent Laid Open Hei 2-160297 discloses a technique for adding to a reproduced sound from a compact disk (CD) a signal of a white noise equalized according to the 1/f fluctuation via a high pass filter (HPF). Moreover, Japanese Patent Laid-Open Hei 4-275596 discloses that the 1/f fluctuation having a parameter section for adding a vibrato effect can add a chorus effect, i.e., sound and frequency fluctuate in a pleasant way. Furthermore, Japanese Patent Laid-Open Hei 4-280197 discloses a technique for adding reverberation having a spatial fluctuation.

Moreover, Japanese Patent Laid-Open Hei 7-28177 discloses that according to a voltage fluctuation obtained from a current fluctuation, it is possible to control the temperature and the wind amount, or the wind. Japanese Patent Laid-Open Hei 7-262403 discloses a technique for synthesizing a natural animation having the 1/f fluctuation characteristic. Japanese Patent Laid-Open Hei 8-6562 discloses a technique for converting a CD reproduction signal into an acoustic signal.

On the other hand, with the advent of the CD, DVCR (digital video cassette recorder), DVD (digital video disk) and the like, an audio signal and a video signal are rapidly digitized. The digitization has a meaning in eliminating the aforementioned fluctuations (noise) but this leads to a criticism of audio manias that the sound is too plain and flat. Actually, it is known that the acoustic power fluctuation and the frequency fluctuation of the classic music also have the 1/f fluctuation.

Digitization is carried out through sampling and quantization by a sample hold circuit and an A/D converter, respectively, with a constant width and size. There is also a technique of ADPCM (adaptive differential pulse code modulation) which changes the quantization width, but the width determined has no fluctuation.

Moreover, when a digital signal CD and an analog signal LP record are prepared from one and the same master tape, there is a evaluation that the CD is inferior because it cannot provide a depth feeling. On the other hand, there is a high evaluation for a music of the 1/f fluctuation.

SUMMARY OF THE INVENTION

It is therefore an object of the present invention to provide a digital signal reproduction apparatus, digital signal reproduction method, a digital signal recording g apparatus, a digital signal recording method, and a recording medium in which fluctuation is added to a sampling or quantization process so as to increase pleasantness, eliminating the digital flatness.

In order to achieve the aforementioned object, the digital signal reproduction apparatus according to the present invention includes: fluctuation generating means for generating the 1/f fluctuation; a reproduction system for reproducing a digital signal; and digital/analog conversion means for converting the digital signal into an analog signal; the digital/analog conversion means controlling the digital/analog conversion characteristic according to the 1/f fluctuation generated by the fluctuation generating means.

The aforementioned digital signal reproduction apparatus is enables to obtain a pleasant sound and image having a profound depth feeling like in the natural world by adding the 1/f fluctuation characteristic in the temporal direction and the amplitude direction of an audio data and a video data which have been digitized.

The digital signal reproduction method according to the present invention generates a 1/f fluctuation; reproduces a digital signal; and controls digital/analog conversion characteristic according to the 1/f fluctuation when converting the reproduced digital signal into an analog signal.

The aforementioned digital signal reproduction method enables to obtain a pleasant sound and image having a profound depth feeling like in the natural world by adding the 1/f fluctuation characteristic in the temporal direction and the amplitude direction of an audio data and a video data which have been digitized.

The digital signal recording apparatus according to the present invention includes: fluctuation generating means for generating a 1/f fluctuation; analog/digital conversion means for converting an analog signal into a digital signal while controlling the analog/digital conversion characteristic according to the generated 1/f fluctuation; and a recording system for recording the digital signal on a recording medium.

The aforementioned digital signal recording apparatus enables to record on a recording medium a digital signal having a pleasant sound and image fluctuations like in the natural world by converting an analog signal into a digital signal while controlling the analog/digital conversion characteristic according to the 1f fluctuation.

The digital signal recording method according to the present invention generates a 1/f fluctuation; converts an analog signal into a digital signal while controlling analog/digital conversion characteristic according to the 1/f fluctuation generated; and records the digital signal on a recording medium.

The aforementioned digital signal recording method enables to record on a recording medium a digital signal having pleasant sound and image fluctuations like in the natural world by converting an analog signal into a digital signal while controlling the analog/digital conversion characteristic according to the 1/f fluctuation.

The recording medium according to the present invention contains a program data for generating a 1/f fluctuation, reproducing a digital signal, and converting the reproduced digital signal into an analog signal while controlling the digital/analog conversion characteristic according to the 1/f fluctuation.

The recording medium according to another aspect of the present invention contains a program data for generating a 1/f fluctuation and converting an analog signal into a digital signal while controlling the analog/digital conversion characteristic according to the generated 1/f fluctuation, so as to record the converted digital signal on a recording medium.

DETAILED DESCRIPTION OF THE PREFERRED EMBODIMENTS

Description will now be directed to embodiments of the present invention with reference to the attached drawings.

The present invention adds to a reproduced digital signal the 1/f fluctuation in the temporal direction and/or in the amplitude direction for carrying out a digital-to-analog conversion so as to be cable to output a pleasant sound signal and a pleasant image signal.

Figure 1:
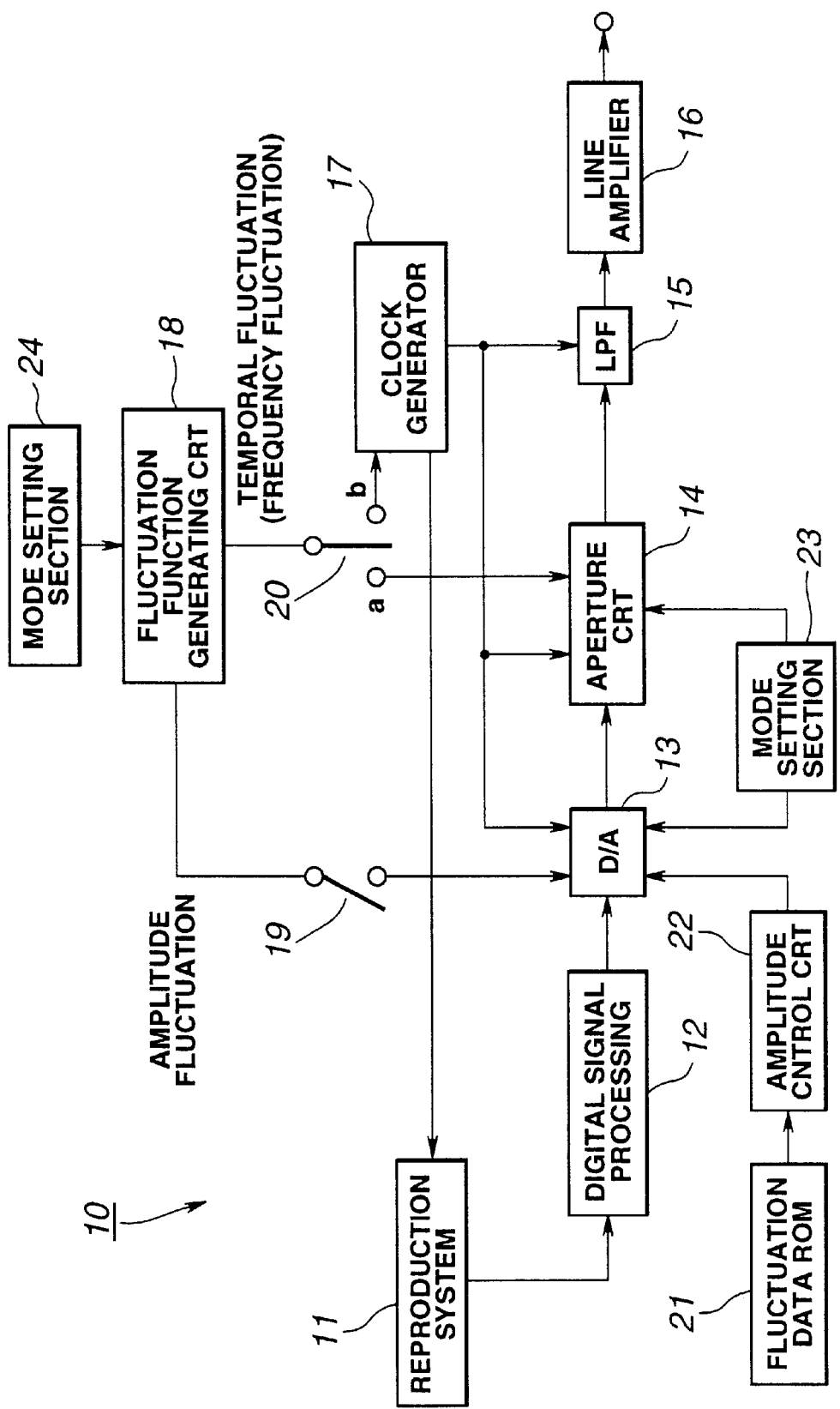
FIG. 1 is a block diagram showing configuration of a digital signal reproduction apparatus according to the present invention.

FIG. 1 is a block diagram showing an example of configuration of a digital signal reproduction apparatus 10 according to the present invention including: a reproduction system for reproducing a digital signal recorded on a recording medium; a digital signal processing circuit 12 for carrying out a predetermined signal processing to a digital signal reproduced; a D/A converter 13; an aperture circuit 14; a low pass filter 15 for eliminating a noise component; a line amplifier for amplifying a signal; a clock generator 17 for supplying a master clock MCK to respective circuits; and a fluctuation function generating circuit 18.

The reproduction system reproduces a digital signal recorded, for example, on a magnetic tape, floppy disk, optical disk or the like, and supplies the digital signal to the digital signal processing circuit 12. The digital signal processing circuit 12 carries out a predetermined signal processing to the digital signal and supplies the resultant signal to the D/A converter 13.

Figure 2:
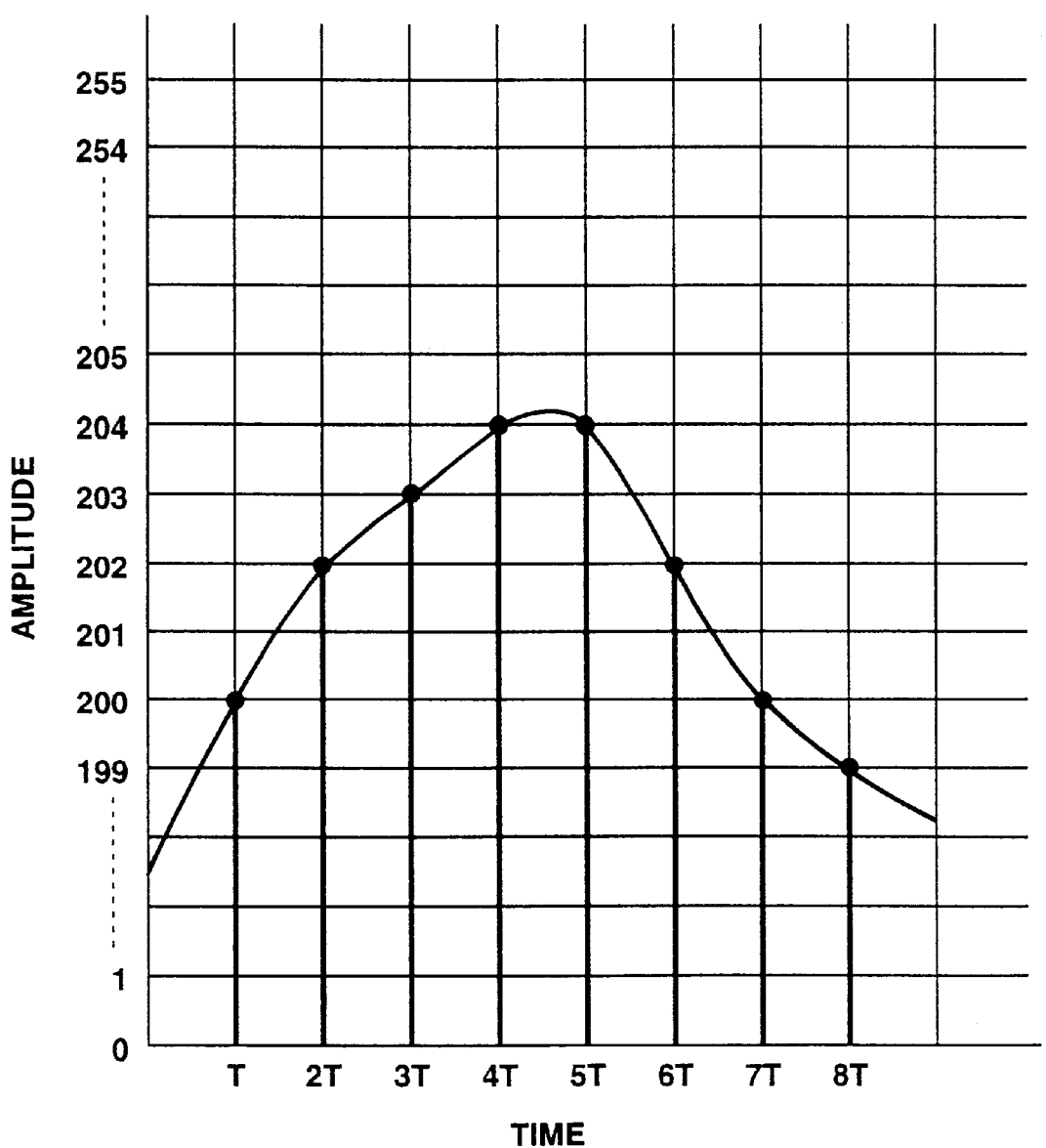
FIG. 2 shows a relationship between the quantization width and the sampling period T in digital-to-analog conversion.

The D/A converter 13 is driven by the master clock MCK from the clock generator 17 and converts the digital signal supplied from the digital signal processing circuit 12, into a sampled analog signal. Here, the D/A converter 13, as shown in FIG. 2 for example, converts the digital signal into an analog signal with an 8-bit quantization width. This quantization width can be modified according to a mode of a mode setting section 23.

The aperture circuit 14 is driven by the master clock MCK from the clock generator 17 and outputs the sampled analog signal from the D/A converter 13, at a sampling interval T. The sampling interval T can be modified by modifying the mode of the aforementioned mode setting section 23.

The low pass filter 15 eliminates a high frequency noise component from the analog signal supplied from the aperture circuit 14 and outputs the resultant analog signal via the line amplifier 16.

The fluctuation function generating circuit 18 generates a fluctuation signal such 1/f fluctuation, $1/f^{1.5}$ fluctuation, 1/f of the natural world or the like, and supplies the fluctuation signal via a switch 19 to the D/A convert 13. The fluctuation function generating circuit 18 supplies the aforementioned fluctuation signal via a switching circuit 20 to the aperture circuit 14 or to the clock generator 17. It should be noted that ON/OFF of the switch 19 and the setting of the switching circuit 20 are carried out independently from each other.

Furthermore, the fluctuation function generating circuit 18, according to the mode setting of a mode setting section 24, can generate a fluctuation signal ranging from $1/f^2$ to 1/f and can adjust the output level of the fluctuation signal. Especially preferable is the fluctuation of $1/f^{1.5}$ which is felt as a pleasant fluctuation by most of the people.

In the digital signal reproduction apparatus 10 having the aforementioned configuration, explanation will be given firstly for a case when the switch 19 is off and the switching circuit 20 is set to a terminal b.

The clock generator 17 generates a master clock MCK having 1/f fluctuation according to a fluctuation signal from the fluctuation function generating circuit and supplies this master clock MCK to the D/A convert 13, to the aperture circuit 14, and to the low pass filter 15.

The D/A converter 13 converts the master clock MCK into an analog signal having a quantization width of (A±ΔA) in which the normal quantization width A has an amplitude fluctuation ΔA. Here, as the amplitude fluctuation DA is 1/f fluctuation, the D/A converter 13 can add the 1/f fluctuation in the amplitude direction (power axis direction) of the analog signal.

For example, the digital signal is assumed to have an amplitude value "11001001b", which is "201" in decimals, becomes "201.4" or "200.6" according to the 1/f fluctuation during digital-to-analog conversion.

Note that the amplitude fluctuation ΔA is, for example:

ΔA=±0.5 bit

This value, however, may be modified according to the user preference.

The aperture circuit 14 outputs a signal at a sampling interval (T±ΔT) in which the normal sampling interval T has a temporal fluctuation ΔT. Here, as the temporal fluctuation ΔT is 1/f fluctuation, the aperture circuit 14 can add the 1/f fluctuation in the temporal axis direction of the analog signal.

Note that the temporal fluctuation DT is for example:

ΔT≈T/1000 to T/100

Next, in a case when the switch 19 is OFF and the switching circuit is set to a terminal a, the D/A converter is driven by the clock generator 17 and outputs an analog signal without fluctuating the amplitude. On the other hand, the aperture circuit 14 is driven by the master clock MCK from the clock generator 17 and supplied with a fluctuation signal from the fluctuation function generating circuit 18. Consequently, the aperture circuit 14 outputs the analog signal while fluctuating the sampling interval T according tot he aforementioned fluctuation signal.

In a case when the switch 19 is ON and the switching circuit 20 is set to the terminal a, the D/A converter 13 and the aperture circuit 14 are supplied with the fluctuation signal from the 1/f fluctuation function generating circuit 18. Consequently, the D/A converter 13 can add the 1/f fluctuation of the amplitude fluctuation ΔA to the quantization width A, whereas the aperture circuit 14 can add the 1/f fluctuation of the temporal fluctuation ΔT to the sampling interval T.

Moreover, the aforementioned digital signal reproduction apparatus 10 is provided with a fluctuation ROM (read only memory) 21 containing data on 1/f fluctuation of classic music performance, 1/f fluctuation of celebrated pictures and the like and an amplitude control circuit 22 for controlling an amplitude voltage value of the analog signal obtained in the D/A converter 13.

The fluctuation ROM 21 contains a data recorded by observing via a band pass filter (frequency zone width Δf) stationary temporal fluctuations from an object to be observed such 1/f fluctuation data of murmuring of a stream in the natural world. Moreover, it is known that a terminal voltage fluctuation generated when a DC current is applied to a resistor is a 1/f fluctuation, which may also be used as a fluctuation data. Furthermore, it is possible to record fluctuation data within a range from $1/f^2$ to 1/f according to the user preference.

The amplitude control circuit 22 controls an amplitude voltage of an analog signal during digital-to-analog conversion according to the fluctuation data from the fluctuation data RIM 21. Consequently, the D/A converter can add to the analog signal amplitude the 1/f fluctuation of classic music performance or a stream murmuring so as to output a pleasant sound signal and an image signal.

It should be noted that the when the D/A converter 13 is supplied with an image signal as a digital signal, the fluctuation may be applied to both or one of the brightness signal and the color-difference signal.

As has thus far been described, the digital signal reproduction apparatus 10 according to the present invention is capable of distorting a digital signal in the amplitude direction and temporal direction of the grating so as to obtain a sound signal and an image signal having the 1/f fluctuation in the respective directions. This 1/f fluctuation is quite natural compared to the 1/f fluctuation which is artificially generated by a noise generator and accordingly, it is possible to obtain a remarkably pleasant sound signal and image signal.

For example, in a film using an actuality film and computer graphics (CG), it is possible to fuse the CG with the actuality film by adding the aforementioned 1/f fluctuation to the CG showing unnatural movements. Moreover, the present invention can be applied to an electronic musical instrument such as a synthesizer for adding the 1/f fluctuation to the reverberation and vibrato so as to output a natural voice.

Depending on the user, it is possible to adjust the quantization width and the sampling period when adding the 1/f fluctuation, which enables to realize a digital reproduction sound having a weight and depth feeling instead of the conventional inorganic digital reproduction sound.

It should be noted that the user can control the aforementioned digital signal reproduction apparatus 10b by installing a predetermined program data recorded on a recording medium. Here, the "predetermined program data" is a program data for generating the 1/f fluctuation, reproducing a digital signal, and controlling the digital/analog conversion characteristic according to the aforementioned 1/f fluctuation for converting the digital signal reproduced, into an analog signal.

In order to control the aforementioned digital/analog conversion, for example, the program data is preferably capable of adding the 1/f fluctuation to the quantization width and to the sampling interval of the aforementioned analog signal according to the 1/f fluctuation generated from the fluctuation function generating circuit 18.

Figure 3:
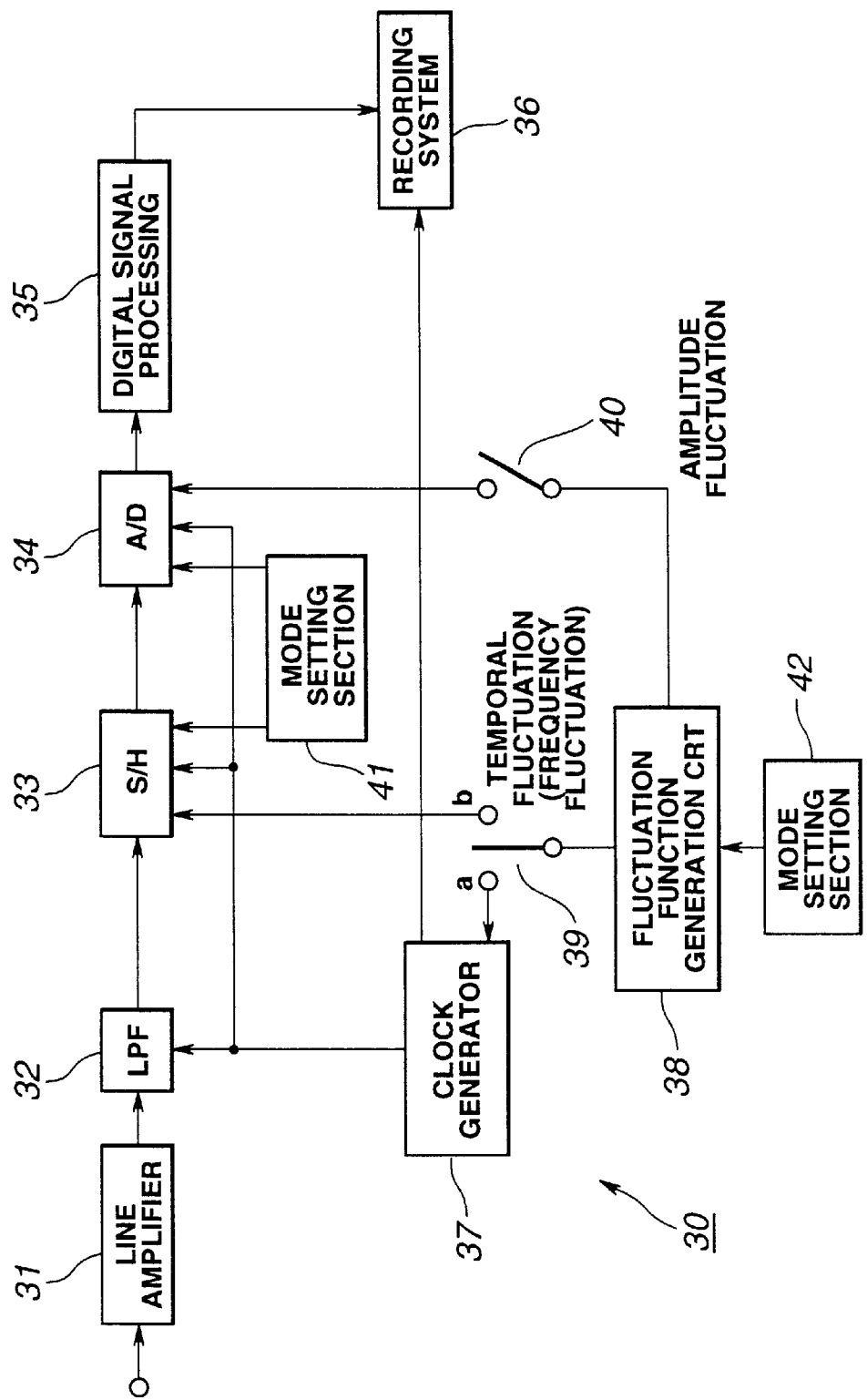
FIG. 3 is a block diagram showing configuration of a digital signal recording apparatus according to the present invention.

On the other hand, a digital signal recording apparatus 30, as shown in FIG. 3 for example, includes: a line amplifier 31; a low pass filter 32; a sample hold circuit 33; an A/D converter 34; a digital signal processing circuit 35; a recording system 36; a clock generator 37; and a fluctuation function generating circuit 38.

The line amplifier 31 is supplied with, an analog signal of a voice signal and an image signal for example, and amplifies the analog signal for supply to the low pass filter 32. The low pass filter 32 eliminate a high frequency noise component and supplies the resultant analog signal to the sample hold circuit 33.

The sample hold circuit 33 samples the analog signal with a predetermined frequency and supplies the sampled analog signal to the A/D converter 34. The A/D converter 34 converts the amplitude width of this analog signal into a digital signal. Note that the sampling period and the quantization width of the amplitude value can be adjusted by the mode setting of a mode setting section 41.

The digital signal processing circuit 35 carries out, for example, a white balance adjustment and gamma correction to the analog signal supplied from the A/D converter 34, and supplies the resultant signal to the recording system 36. In the recording system 36, the aforementioned digital signal is recorded on a recording medium such as a magnetic tape, a floppy disk, and an optical disk.

Here, the clock generator 37 generates a predetermined master clock MCK so as to drive the low pass filter 32, the sample hold circuit 33, the A/D converter 34, and the recording system 36.

The fluctuation function generating circuit has a configuration identical to that of the aforementioned fluctuation function generating circuit 18 and generates a fluctuation signal having the 1/f fluctuation characteristic. Note that this circuit is capable of generating a fluctuation signal ranging from $1/f^2$ to 1/f according to the mode setting of a mode setting section 42 as well as adjusting the output level of the fluctuation signal. Moreover, the fluctuation function generating circuit 38 supplies the fluctuation signal via a switching circuit 39 to the sample hold circuit 33 or to the clock generator 37, and via a switch 40 to the A/D converter 34. It should be noted that the switching circuit 39 and the switch 40 can be controlled independently from each other.

In the digital signal recording apparatus having the aforementioned configuration, for example, when the switching circuit 39 is set to a terminal a and the switch 40 is OFF, the fluctuation function generating circuit 38 supplies a fluctuation signal via the switching circuit 39 to the clock generator 37. The clock generator 37 fluctuates the master clock MCK according to this fluctuation signal and supplies the fluctuated master clock MCK to respective circuits.

The sample hold circuit 33 carries out a sampling processing to the analog signal supplied, by adding a temporal fluctuation ΔT to the sampling frequency period T. That is, the sample hold circuit 33 adds the 1/f fluctuation in the temporal axis direction of the analog signal supplied.

The A/D converter 34 adds an amplitude fluctuation ΔA to the quantization width A of the analog signal sampled in the sample hold circuit 33, thus converting the analog signal into a digital signal. That is, the A/D converter 34 adds the 1/f fluctuation in the amplitude direction (power axis direction) of the analog signal.

Moreover, in a case when the switching circuit 39 is set to a terminal b and the switch 40 is OFF, the sample hold circuit 33 adds the 1/f fluctuation in the temporal axis direction of the analog signal. When the switching circuit 39 is not set to any of a and b and the switch 40 is ON, the A/D converter 34 adds the 1/f fluctuation in the amplitude direction of the analog signal.

As has thus far been described, the user can adjust the amplitude quantization width and the sampling period of an analog signal for adding the 1/f fluctuation, enabling to record on a recording medium a digital signal having a weight and depth feeling instead of the conventional inorganic digital reproduction sound.

Moreover, in a case of an image signal, it is possible to add the 1/f fluctuation to one or both of the brightness signal and the color-difference signal.

It should be noted that the user can carry out the aforementioned control to the aforementioned digital signal recording apparatus 30 by installing a predetermined program data recorded on a recording medium. Here, the predetermined program data means a program data for generating the 1/f fluctuation, controlling the analog/digital conversion characteristic according to the generated 1/f fluctuation, converting an analog signal into a digital signal, and recording the converted digital signal on a recording medium.

In order to control the aforementioned digital/analog conversion characteristic, the program data is preferably capable of, for example, adding the 1/f fluctuation to the quantization width of the aforementioned analog signal and adding the 1/f fluctuation to the sampling interval of the aforementioned analog signal, according to the 1/f fluctuation generated from the fluctuation function generating circuit 38.

Moreover, the present invention is not limited to the aforementioned embodiments but can be applied not only to the ordinary PCM (pulse code modulation) but also to the ADPCM (adaptive pulse code modulation) and the ADM (adaptive delta modulation).

As has thus far been described, the digital signal reproduction apparatus according to the present invention is capable of adding the 1/f fluctuation characteristic in the temporal axis direction and the amplitude direction of an audio data and a video data which have been digitized, thus enabling to obtain a pleasant sound and a pleasant image having a depth feeling like in the natural world.

Moreover, the signal reproduction method according to the present invention is capable of adding the 1/f fluctuation characteristic in the temporal axis direction and the amplitude direction of an audio data and a video data which have been digitized, thus enabling to obtain a pleasant sound and a pleasant image having a depth feeling like the natural world.

The digital signal recording apparatus according to the present invention has an analog/digital conversion means which controls the analog/digital conversion according to the 1/f fluctuation when converting an analog signal into a digital signal, and is capable of recording on a recording medium a digital signal consisting of a pleasant sound and image having a depth feeling like in the natural world.

The digital signal recording method according to the present invention controls the analog/digital conversion characteristic according to the 1/f fluctuation when converting an analog signal into a digital signal, which digital signal is recorded on a recording medium, thus enabling to record on a recording medium a digital signal consisting of a pleasant sound and image having a depth feeling like in the natural world.

The recording medium according to the present invention is capable of controlling a digital signal reproduction apparatus so as to reproduce a pleasant sound and image having a depth feeling like in the natural world by recording a program data for generating the 1/f fluctuation, reproducing a digital signal and converting the reproduced digital signal into an analog signal while controlling the digital/analog conversion characteristic according to the aforementioned 1/f fluctuation.

The recording medium according to the present invention contains a program data for generating the 1/f fluctuation, controlling the analog/digital conversion characteristic according to the 1/f fluctuation generated when converting an analog signal into a digital signal, and recording the converted digital signal on a recording medium, and is capable of controlling a digital signal recording apparatus so as to obtain a pleasant sound and image having a depth feeling like in the natural world.

What is claimed is:

1. A digital signal reproduction apparatus for reproducing a digital signal recorded on a recording medium, comprising:

fluctuation generating means for generating a 1/f fluctuation signal;

reproducing means for reproducing said digital signal from said recording medium; and digital/analog conversion means for converting said digital signal into an analog signal; wherein at least one of the amplitude or the quantization or the period of the sampling frequency of said digital/analog conversion means is controlled by adding the 1/f fluctuation signal to a quantization width of said reproduced digital signal according to the 1/f fluctuation signal generated by said fluctuation generating means.

2. A digital signal reproduction apparatus as claimed in claim 1, said apparatus further comprising mode setting means for setting said quantization width so that said digital/analog conversion means adds the 1/f fluctuation to said quantization width which has been set.

3. A digital signal reproduction apparatus as claimed in claim 1, wherein said digital/analog conversion means controls said digital/analog conversion characteristic by adding the 1/f fluctuation to a sampling interval of said analog signal according to the 1/fluctuation generated by said fluctuation generating means.

4. A digital signal reproduction apparatus as claimed in claim 3, said apparatus further comprises mode setting means for setting said sampling interval so that said digital/analog conversion means adds the 1/f fluctuation to the analog signal sampling interval which has been set.

5. A digital signal reproduction method for reproducing a digital signal recorded on a recording medium comprising the steps of:

generating a 1/f fluctuation signal;

reproducing the digital signal; and converting said reproduced digital signal into an analog signal by controlling at least one of the amplitude or the quantization or the period of the sampling frequency of the digital/analog conversion by adding the 1/f fluctuation signal to a quantization width according to said 1/f fluctuation signal generated.

6. A digital signal reproduction method as claimed in claim 5, wherein said quantization width is set to a particular value and the 1/f fluctuation is added to said quantization width which has been set, so as to control said digital/analog conversion.

7. A digital signal reproduction method as claimed in claim 5, wherein said digital/analog conversion characteristic is controlled by adding said generated 1/f fluctuation to a sampling interval of said analog signal according to said 1/f fluctuation generated.

8. A digital signal reproduction method as claimed in claim 7, wherein said sampling interval is set to a particular value and said 1/f fluctuation is added to said analog signal sampling interval which has been set, so as to control said digital/analog conversion characteristic.

9. A digital signal recording apparatus comprising:

fluctuation generating means for generating a 1/f fluctuation signal;

analog/digital conversion means for converting an input analog signal into a digital signal; wherein at least one of the amplitude or the quantization or the period of the sampling frequency of said analog/digital conversion means is controlled according to the generated 1/f fluctuation signal; and recording means for recording said digital signal supplied from said analog/digital conversion means on a recording medium.

10. A digital signal recording apparatus as claimed in claim 9, wherein said analog/digital conversion means uses the generated 1/f fluctuation for controlling said digital/analog conversion characteristic by adding the 1/f fluctuation to a quantization width of said analog signal.

11. A digital signal recording apparatus as claimed in claim 10, said apparatus further comprising mode setting means for setting said quantization width to a particular value so that said analog/digital conversion means adds the 1/f fluctuation to said quantization width which has been set.

12. A digital signal recording apparatus as claimed in claim 9, said apparatus further comprising sample hold means for adding a 1/f fluctuation to a sampling interval of the analog signal supplied according to the 1/f fluctuation generated by said fluctuation generating means, so as to sample-hold said analog signal, which analog signal is converted into a digital signal by said analog/digital conversion means.

13. A digital signal recording apparatus as claimed in claim 12, said apparatus further comprising mode setting means for setting said sampling interval to a particular value so that said sample hold means adds the 1/f fluctuation to the analog signal sampling interval which has been set.

14. A digital signal recording apparatus as claimed in claim 9, wherein said fluctuation generating means generates $1/f^a$ ($1<a<2$) fluctuation.

15. A digital signal recording apparatus as claimed in claim 9, said apparatus further comprising mode setting means for setting the level of the 1/f fluctuation to a particular value so that said fluctuation generating means is based on the setting of said mode setting means so as to generate a 1/f fluctuation whose level has been adjusted.

16. A digital signal recording method for recording an analog signal onto a digital recording medium according to a 1/f fluctuation, comprising the steps of:

generating a 1/f fluctuation signal;

converting the analog signal into a digital signal by controlling at least one of the amplitude or the quantization or the period of the sampling frequency of the analog/digital conversion characteristics according to the generated 1/f fluctuation signal; and recording said digital signal on the digital recording medium.

17. A digital signal recording method as claimed in claim 16, wherein according to the 1/f fluctuation generated, the 1/f fluctuation is added to a quantization width of said analog signal, so as to control said digital/analog conversion characteristic.

18. A digital signal recording method as claimed in claim 17, wherein said quantization width is set to a particular value and the 1/f fluctuation is added to said quantization width which has been set.

19. A digital signal recording method as claimed in claim 16, wherein the 1/f fluctuation is added to a sampling interval of the analog signal which has been supplied according to the 1/f fluctuation generated and said analog signal is sample-held so as to be converted into a digital signal.

20. A digital signal recording method as claimed in claim 19, wherein said sampling interval is set to a particular value and the 1/f fluctuation is added to the analog signal sampling interval which has been set.

21. A digital signal recording method as claimed in claim 16, wherein 1/fa ($1<a<2$) fluctuation is generated as said 1/f fluctuation.

22. A digital signal recording method as claimed in claim 16, wherein said the level of 1/f fluctuation is set to a particular value and the 1/f fluctuation generated is adjusted in level according to the setting.

* * * * *